Figures 1, 10:
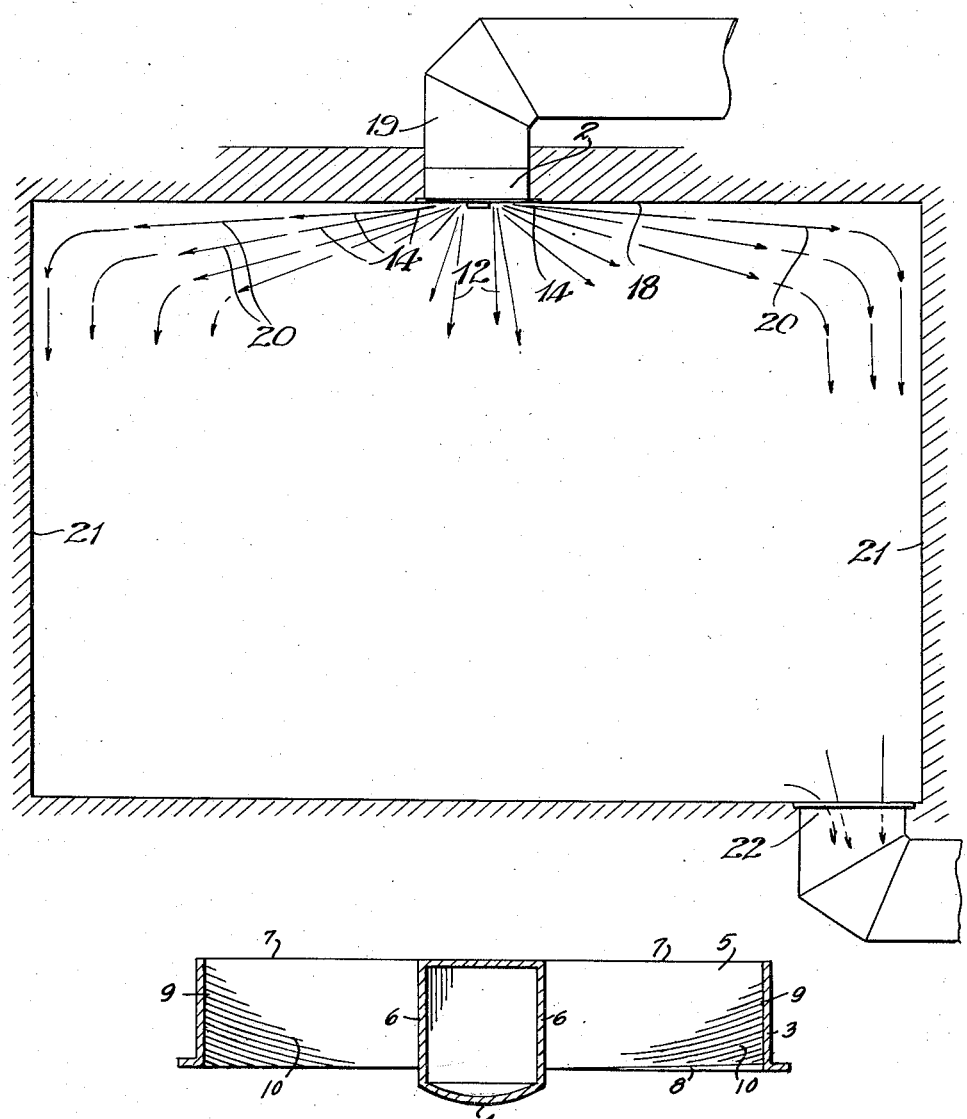

April 25, 1950     W. H. GOETTL     2,505,394
VENTILATING REGISTER

Filed May 20, 1947     2 Sheets-Sheet 1

Inventor
William H. Goettl
By Scott L. Norviel
Attorney

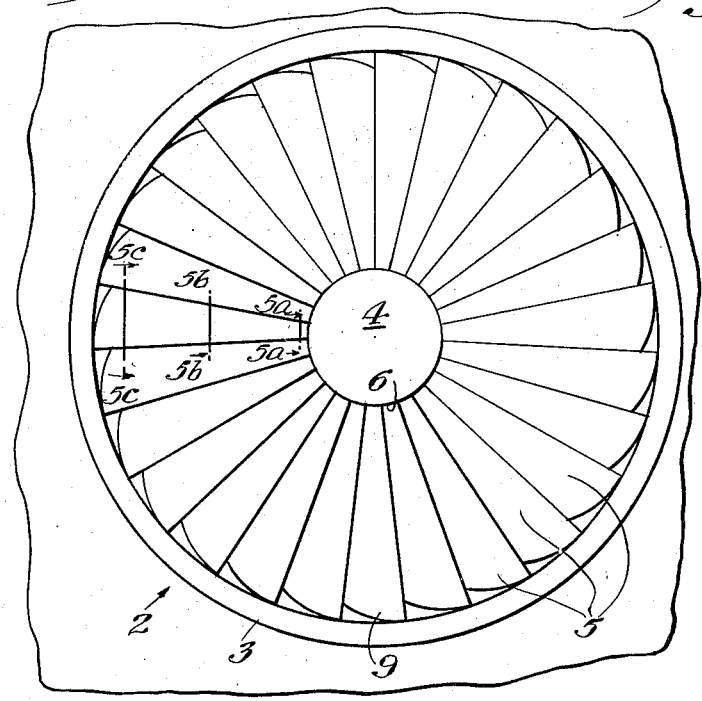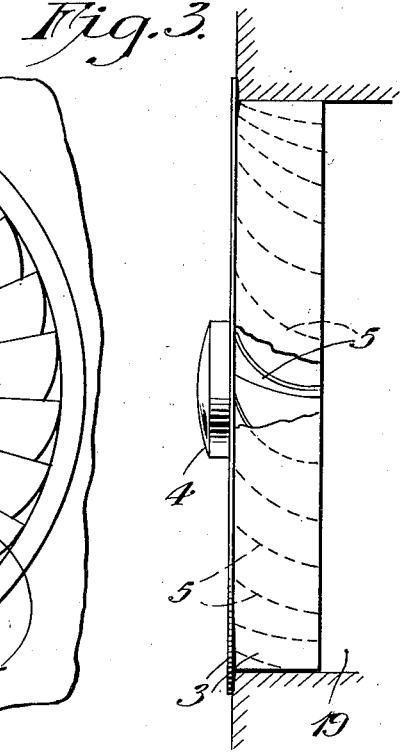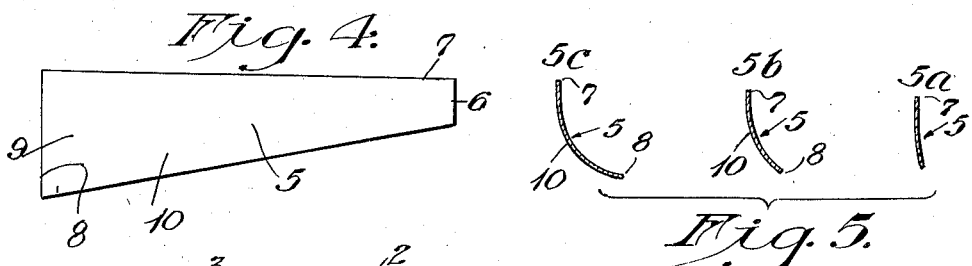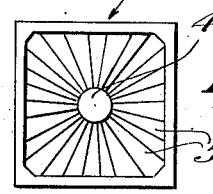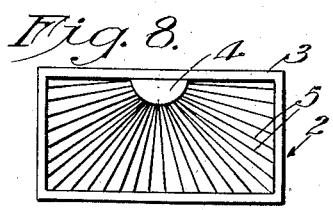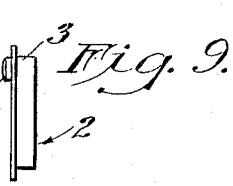

Patented Apr. 25, 1950

2,505,394

UNITED STATES PATENT OFFICE 2,505,394

VENTILATING REGISTER

William H. Goettl, Phoenix, Ariz.

Application May 20, 1947, Serial No. 749,191

2 Claims. (Cl. 98—40)

This invention relates to ventilating registers, of the type suited to evaporative coolers.

Registers have heretofore been extensively used in directing and controlling heated air issuing from the ducts of hot air furnaces, also in controlling dry refrigerated air used in cooling habitations. There are many types of these registers, but generally their purposes are the same in that they are used to distribute the air passing through them, to some extent, so that it will mix with the residual room air to attain the desired temperature, humidity, and the like.

The art of "wet air" or "evaporative" air cooling has developed extensively in the southwestern portion of the United States within the last few years. As the art developed one of the early discoveries was that the volume of air necessary to cool a living space must be much greater than the volume of dry refrigerated air used in connection with standard refrigeration apparatus. This was due principally to the fact that, under average atmospheric conditions, the temperature drop of air introduced from an evaporated cooler is limited and this air cannot be mixed with uncooled air if the living space is to be maintained at a comfortable temperature.

A second discovery was that, since the air introduced became humid in passing through the evaporative cooler, it was necessary to keep the air in motion throughout the entire living space or habitation and not permit it to become stagnant in room corners, alcoves, or the like. As a corollary to this it became apparent that air must be blown through the living space and exhausted as fast as it was admitted from the cooler.

The first coolers used were merely fans of various types placed in evaporative boxes and arranged to draw outside air through the box, into the room through a window opening. Later improvements introduced centrifugal blowers from which air was led to various rooms through ducts. When conventional registers were used at the entrance ends of these ducts the results were disappointing. The rooms served by these ducts simply were not sufficiently sensibly cooled.

In view of this I have discovered that if a register is designed to distribute air from the evaporative cooler duct throughout the entire room area the sensible temperature will be more apparent and comfortable. This distribution of the air takes into consideration the volume of air furnished by the cooler and must be such that a current of air passes over the ceiling, as well as the walls of the room to be cooled, and thus reaches all corners of the room, including dead air spaces behind furniture, before exhausting through a vent, preferably in or near the floor.

In view of the foregoing, I have developed the hereinafter described register which has for its objects:

First, the provision of a register which will distribute a large volume of air issuing from an evaporative cooler duct throughout the whole area of a living space or room to be cooled;

Second, the provision of a register which will distribute duct air passing therethrough at a considerable velocity without noise or vibration;

Third, a register, of the type mentioned, which will divide the air entering and distribute one portion so that it flows along and over the ceiling or wall surface and through which the duct enters, and the other portion in varying quantities, directly out from the duct;

Fourth, a register, as mentioned, which will distribute a large portion of the duct air in a flow at right angles to the direction of flow through the duct at the place of entry into the room, and a less portion in a direction alined to that of said duct flow; and Fifth, a register which will direct a flow of air from a wall or ceiling duct substantially parallel to said wall or ceiling with a somewhat rotary motion so as to create sufficient turbulence to scavenge all portions of the room space and prevent formation of stagnant air pockets.

Other objects will appear hereinafter.

I attain the foregoing objects by means of the devices, manufacture, and structure shown in the accompanying drawings, in which:

Figure 1 is a semi-diagrammatic illustration of a register embodying my improvements installed in a room with the flow of air indicated by arrows;

Figure 2, a plan view of one form of the device drawn on a larger scale;

Figure 3, a transverse sectional view thereof;

Figure 4, an elevational view of one of the directive vanes of said register;

Figure 5, a group of sections taken at 5a, 5b and 5c, respectively, of Figure 2, showing the sectional curvature of the several directive vanes;

Figure 6, a plan view of a modified form of register drawn on a reduced scale;

Figure 7, a side elevation thereof;

Figure 8, a plan view of a further modified form;

Figure 9, a side elevation thereof; and

Figure 10, a vertical mid-sectional view of the device as shown in Figure 2.

Similar numerals refer to similar parts in the several views.

The register 2 has a circular peripheral case 3 and a central cylindrical hub 4. Directive vanes 5 made of sheet metal are attached at their inner ends to the circumference of the hub, extend radially therefrom, and are secured to the inner face of the case.

The vanes are positioned so that the inner end 6 of each vane is attached to the hub 4 with its edge alined with the axis of the hub. The inner edge portion 7 of each vane maintains this alinement until it reaches the case, but the outer edge portion 8 is bent and curved from the hub outward so that the camber of each blade increases progressively from the inner end to the outer end 9. This curvature is formed on each blade so that the outer edge extends substantially at right angles to the axis of the hub, or at right angles to the direction of flow, throughout its outer portion 10. The inner edge 7, however, extends in a straight line radially from the hub. This vane curvature is best illustrated in Figure 5. Here the section taken at 5a shows the blade only slightly cambered near the hub, section 5b shows the camber increasing toward the middle, and section 5c shows the camber near the outer end, with the inner edge 7 alined with the direction of flow and the outer edge 8 substantially at right angles thereto.

The result of this structure is that the duct air passing through the central portion of the register issues with a minimum of turbulence straight ahead of the register as indicated by numeral 12, whereas the greater volume of air passing through the peripheral area 14 issues from the register in an expanding rotative pattern parallel to the plane of the wall 18 in which the register is set, or substantially at right angles to the axis of the hub or whole of the register, as indicated by numeral 20.

Since the distance between the vanes increases according to their relative radial position, toward the peripheral frame, a gap might appear between them unless they were made wider toward their outer ends. They are therefore made with greater width toward their outer ends. This enables the camber curvature to be increased and the space between them to be entirely closed by overlapping portions of their outer edges.

When the register is installed on a duct 19 in a ceiling the flow 20 expands until it strikes the obstruction of the room walls 21. It then flows downward along these walls to the floor. In the meantime the central area of the room is ventilated by the flow 12. Thus the whole room area is fully ventilated, and as the air is all forced toward the floor it may be easily removed through the exhaust vent 22.

Ventilation through a register of this type reaches the intended efficiency only when connected to evaporative air coolers having large output volume. Thus coolers of 2500 cubic feet per minute are indicated for room spaces of 4000 cubic feet or thereabouts.

Where ceiling installation is impractical I provide a slightly modified form of register, as shown in Figures 6 and 8. The basic principles of construction and operation, however, are the same. There is first a case 3, then a hub 4, and lastly a plurality of vanes 5 extending radially from the hub to the case with their outer directive edges 8 increasingly cambered to parallel the outer face of the register body.

The register is intended for use as above stated and in view of this may be considered as one element of a combination for distributing evaporative cooler air from a duct throughout a room having walls angularly disposed relative to the face of the register and a floor provided with an exit vent.

In view of the foregoing, and realizing that there are many divers types of registers, I intend that the following specific claims should be tendered a broad interpretation.

I claim:
1. A register for distributing air passing therethrough, throughout the interior of a room, comprising in combination, a hub, a frame having a flat inner face surrounding said hub, a plurality of equally spaced air-directive blades extending radially from said hub to said frame; said blades being formed of sheet material of increasing width outwardly and curved transversely from edge to edge with a progressively increasing depth of curvature outward from their inner hub edge, and being poistioned between said hub and said frame so that their inner end portions are substantially parallel to the axis of said hub, their inner edges in the same plane as that of the inner edge of said frame and portions adjacent the inner edges extend outward parallel to the direction of air flow therethrough and portions of their outer edges have a progressively increasing curvature from the hub end outward, so that the outer end portions adjacent the outer edge portions of each blade extend substantially at right angles to the direction of air flow through said register.

2. A register for distributing air from a duct throughout a room so that a central portion of the air flowing therethrough flows directly parallel to the axis of said register and the remainder is directed outward in an expanding cone with the upper portions of said cone directed substantially at right angles to the axis of said register, comprising, in combination, a body having an outer peripheral casing with inner walls parallel to the direction of air-flow therethrough, a cylindrical hub, a plurality of equispaced radially extending vanes with the inner ends attached to said hub and the outer ends attached to the inner face of said casing walls; the upper and lower edges of said blades being substantially parallel to and alined with the inner and outer faces of said casing, each blade having its inner ends substantially parallel to the axis of said hub and the direction of air flow, and being transversely curved with a curvature of increasing depth progressively outward, so that the effective resulting pitch decreases outward; the said blades having their width increasing outwardly so that outer portions adjacent the outer edges are in overlapping relation to each next adjacent blade.

WILLIAM H. GOETTL.

REFERENCES CITED

The following references are of record in the file of this patent:

UNITED STATES PATENTS

| Number | Name | Date |
| --- | --- | --- |
| 616,963 | Pearl | Jan. 3, 1899 |
| 2,053,403 | McCormick | Sept. 8, 1936 |
| 2,190,937 | Demuth | Feb. 20, 1940 |
| 2,264,659 | Christiansen | Dec. 2, 1941 |
| 2,332,762 | Stempel et al. | Oct. 26, 1943 |
| 2,362,355 | Collicutt | Nov. 7, 1944 |
| 2,381,345 | Greenlaw | Aug. 7, 1945 |

FOREIGN PATENTS

| Number | Country | Date |
| --- | --- | --- |
| 533,063 | Germany | Sept. 7, 1931 |
| 534,283 | France | Jan. 3, 1922 |